United States Patent [19]
Kishishita

[11] 3,933,132
[45] Jan. 20, 1976

[54] ANOTHER LIQUID-MIXING INJECTION SYSTEM FOR INTERNAL-COMBUSTION ENGINE

[75] Inventor: Keiji Kishishita, Yokohama, Japan

[73] Assignee: Isuzu Motors Limited, Japan

[22] Filed: Dec. 17, 1974

[21] Appl. No.: 533,717

Related U.S. Application Data

[63] Continuation-in-part of Ser. No. 441,382, Feb. 11, 1974, abandoned, which is a continuation of Ser. No. 299,617, Oct. 11, 1972, abandoned.

[30] Foreign Application Priority Data
Oct. 20, 1971   Japan .............................. 46-83041

[52] U.S. Cl. ....................... 123/25 C; 123/139 DP
[51] Int. Cl.² ........................................ F02D 47/00
[58] Field of Search .......... 123/25 C, 25 D, 139 DP

[56] References Cited
UNITED STATES PATENTS

| | | | |
|---|---|---|---|
| 704,995 | 7/1902 | Weiss | 123/25 C |
| 1,698,468 | 1/1929 | Beals | 123/25 C |
| 2,163,313 | 6/1939 | Voit | 123/139 DP |
| 2,625,141 | 1/1953 | Berlyn | 123/25 D |

FOREIGN PATENTS OR APPLICATIONS

| | | | |
|---|---|---|---|
| 835,192 | 9/1938 | France | 123/25 C |
| 1,958,732 | 1/1968 | Germany | 123/25 C |

*Primary Examiner*—Charles J. Myhre
*Assistant Examiner*—R. H. Lazarus
*Attorney, Agent, or Firm*—Toren, McGeady and Stanger

[57] ABSTRACT

In an internal-combustion engine including a fuel injection system which comprises a fuel injection pump, a delivery valve, a fuel line, and a fuel line injection nozzle, another liquid mixing-injection system characterized in that another liquid source is connected to a desired point between the delivery valve and fuel injection orifice of the fuel injection system.

5 Claims, 4 Drawing Figures

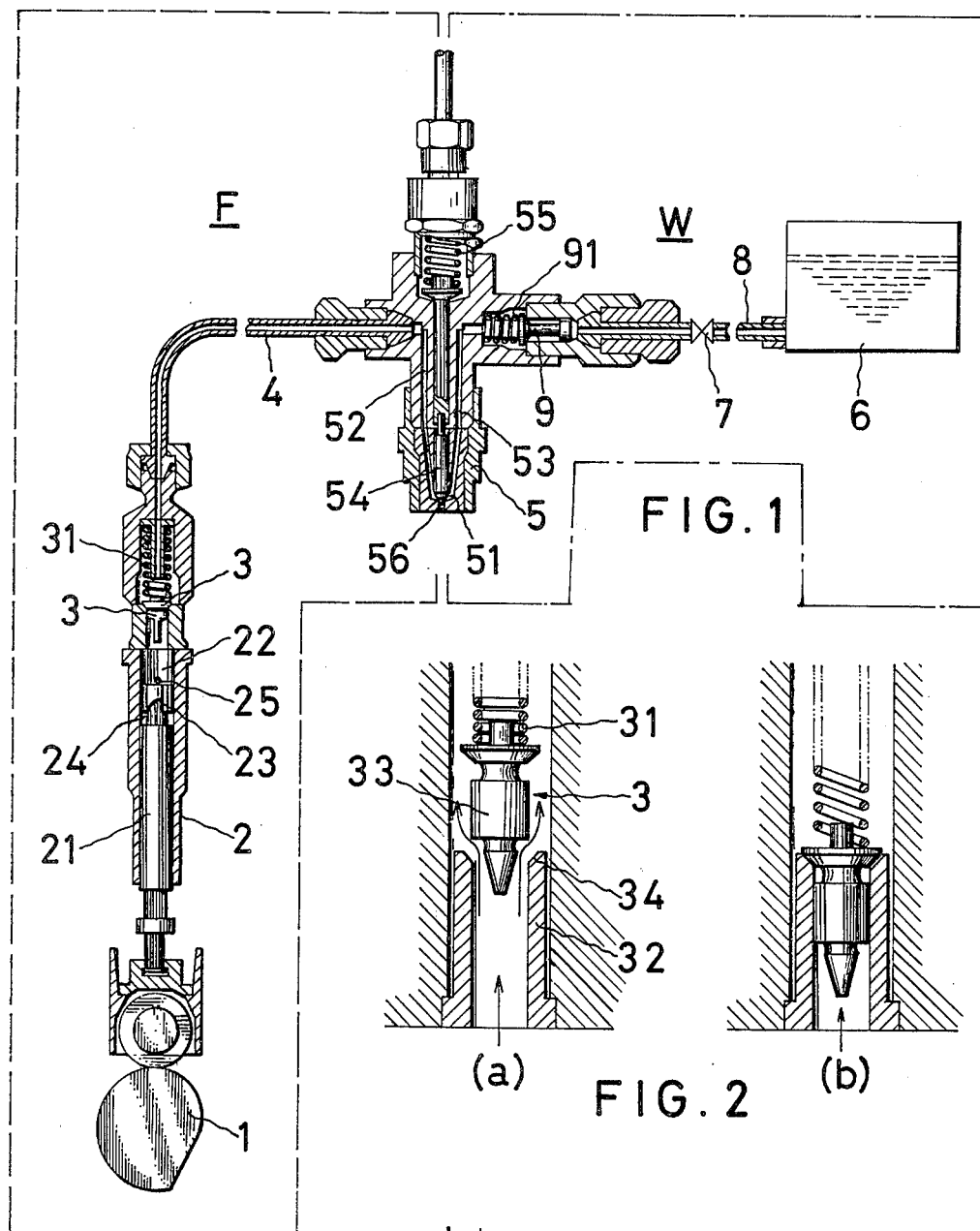
FIG. 1
FIG. 2
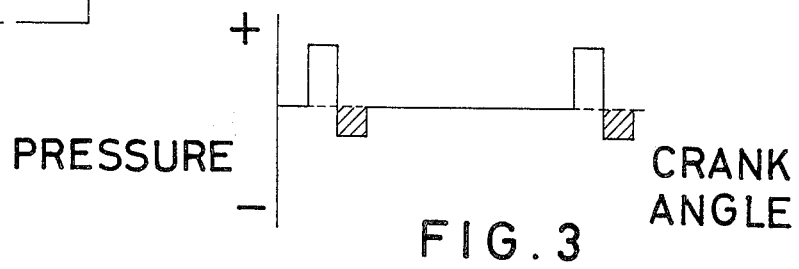
FIG. 3

ANOTHER LIQUID-MIXING INJECTION SYSTEM FOR INTERNAL-COMBUSTION ENGINE

CROSS-REFERENCE TO COPENDING APPLICATION

This is a continuation-in-part application of Ser. No. 441,382 filed on Feb. 11, 1974 now abandoned, which is itself a continuation of Ser. No. 299,617 filed on Oct. 11, 1972, now abandoned.

SUMMARY OF THE INVENTION

This invention relates to another liquid-mixing injection system for internal-combustion engines, and more specifically to a system for mixing another liquid other than a fuel, such as water, in ordinary fuel oil and allowing the mixture to be injected into the combustion chamber of an internal-combustion engine.

It is known that the injection of water into the combustion chamber of an internal-combustion engine for lowering the combustion temperature of the charged fuel is very helpful in inhibiting the generation of nitrogen oxides ($NO_x$) in the burning gases. According to the concept, the water injection system usually comprises a water pump and a water injection nozzle, both of special designs, mounted on an engine so that water under pressure can be admitted to the combustion chamber or intake pipe. However the arrangement involves a large consumption of water and the ingress of water into other parts of the engine can cause various troubles. With these disadvantages most of the systems thus far contrived or proposed have been of no practical use.

Therefore, the present invention has for its object to provide a novel injection system whereby a suitably controlled amount of water is injected, together with fuel oil, into the combustion chamber of an internal-combustion engine so that the emission of nitrogen oxides as combustion products can be minimized through concentrated cooling of the flame (lowering of the combustion temperature) and reduction of oxygen partial pressure The system according to this invention is characterized in that, in an engine having a fuel injection system which includes a fuel injection pump, a delivery valve, fuel line, fuel injection nozzle, etc. the another liquid source is connected via a check valve and the fuel injection orifice of the nozzle, in such manner that the another liquid can be admitted to the fuel injection system by the negative pressure that is produced by the retractive action of the delivery valve and the liquid can then be injected together with the fuel oil through the fuel injection orifice into the combustion chamber of the engine.

In accordance with the present invention, water is injected so as to be fully atomized around the flame and the water consumption is so small that the disadvantages of the conventional systems are all eliminated. More important, the present invention needs no special pump or nozzle for the purpose of water injection.

The object, features and advantages of the present invention will be better understood from the following description taken in conjunction with the accompanying drawing, although it should be understood, of course, that the invention is not limited to the embodiment disclosed.

BRIEF DESCRIPTION OF THE DRAWING

In the drawing:

FIG. 1 is a vertical sectional view of a device embodying the present invention:

FIGS. 2 (a) and 2 (b) are vertical sectional views showing a delivery valve in the open and closed positions, respectively;

FIG. 3 is a graph of a theoretical model of the fuel oil pressure in a reserve well relative to the crank angle.

DETAILED DESCRIPTION OF PREFERRED EMBODIMENT

Figure 4:
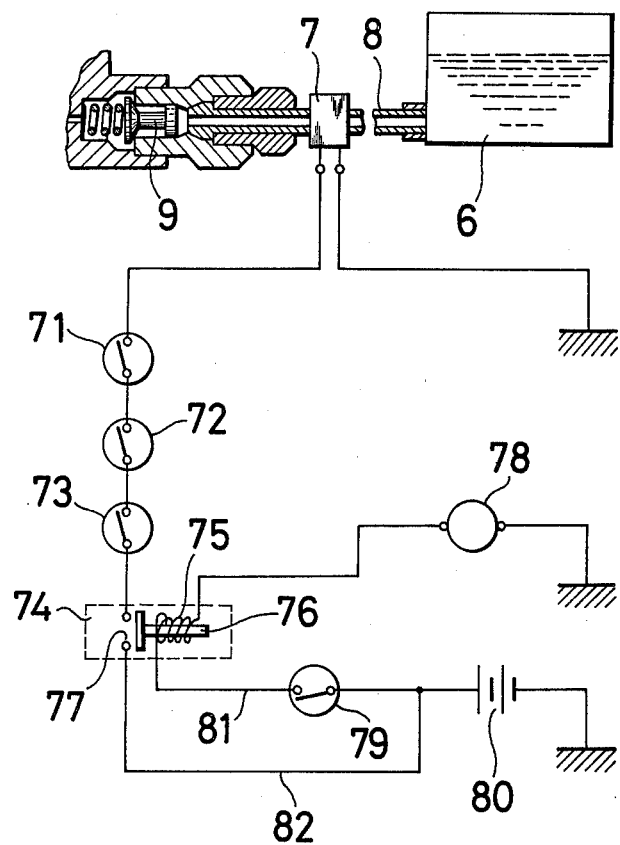
FIG. 4 is a vertical cross-sectional view of the main part of apparatus of the present invention in which a valve to open and close in synchronization with a load on an engine is secured to a pipe between a check valve and a reservoir tank, with a control mechanism of said valve shown by a circuit diagram.

Referring to FIG. 1, there is shown a conventional fuel injection system surrounded by long dash lines generally designated F. The system F comprises a cam 1 for transmitting thereto the power from an engine not shown, a fuel injection pump 2, a delivery valve 3, a fuel line 4, and a fuel injection nozzle 5. Surrounded by alternate long and short dash lines and generally designated as W is a water injection system especially provided in accordance with the present invention. The system W, comprising a water tank 6, a valve 7, a water pipe 8, and a check valve 9, is connected to the fuel injection system F. In addition to a fuel oil passage 52 leading to a space 51 in the fuel injection nozzle 5, a similar passage 53 for water is provided within the nozzle 5 and is formed in communication with the check valve 9. In this way the fuel injection system F and the water injection system W are coupled together.

With the construction above described, the equipment according to this invention operates in the following way. A revolution of the cam 1 lifts a plunger 21 at the fuel injection pump 2 and the plunger exerts a pressure on the fuel oil in a barrel 22. At the point where the pressure exceeds a predetermined value, the fuel pushes the delivery valve 3 open against a spring 31 and flows through the line 4 and the fuel passage 52 of the fuel injection nozzle 5 into the space 51. There the fuel oil opens a needle valve 54 by forcing it upward against a spring 55 and issues out through an orifice 56. As soon as the barrel 22 is communicated to a spill hole 25 through a groove 23 of the plunger 21 and a fuel retraction space 24, the fuel pressure is relieved and the sharp pressure drop within the barrel 22 enables the delivery valve 3 to be forced back by the spring 31 to its original position. At this time, part of the fuel trapped between the line 4 and the space 51 is retracted and a negative pressure is produced for the fuel in the line. This action, which is well known in the art, will be described in more detail hereunder with reference to FIGS. 2(a) and 2(b) showing the delivery valve 3 in the fuel-injecting and non-injecting positions, respectively. In the manner above described, the pressure drop of the fuel in the barrel 22 causes the delivery valve 3 to be forced back by the spring 31 into the cylinder 32, shifting from the position of FIG. 2(a) to the position of FIG. 2(b). During the period in which the piston 33 of the valve 3 moves through a seat 34 to the fuel shut-off position as shown in FIG. 2(b), the pumping action of the piston 33 causes the fuel in the fuel injection nozzle 5 to be retracted by an amount equal to the volume of the piston 33, thereby giving a pressure decrease in the nozzle. Originally the delivery valve 3 is provided to ensure a sharp "cut-off" following each injection of fuel. In accordance with the present invention, the pressure decrease that is produced by the action of the delivery valve 3 is taken advantage of in supplying water to the fuel injection nozzle 5.

The pressure decrease produced in this way in the fuel line 4, fuel passage 52, and space 51 acts on the check valve 9 via the water passage 53 to open the check valve aganist the urging of a spring 91 and thereby admit a certain amount of water from the water tank 6 to the space 51, fuel passage 52 or fuel line 4. Thus, the water is mixed with the fuel for the next fuel injection. The amount of water corresponds to the negative pressure, or is approximately equal to the volume of the piston 33 of the delivery valve 3. It follows that an optimum amount of water to be injected into the engine can be obtained by adjusting the volume of the piston 33.

The process above described is repeated for each combustion cycle of the engine, and, as graphically shown in terms of fuel pressure changes in FIG. 3, water is supplied at intervals for the durations of pressure decrease (as hatched in the graph). Since water issues out from the same nozzle as used by the fuel, in an atomized state, either before the injection of the fuel or in mixture with the fuel, the advantages of the invention summarized in the early part hereof can be fully assured.

While the water injection system W in the embodiment being described is coupled to the fuel injection system F by way of the fuel injection nozzle 5, it may be connected, instead, to any other point of the fuel injection system because the pressure decrease that is produced by the delivery valve 3 works uniformly through the fuel line 4 down to the space 51. In any case, it is only necessary to have the water supplied by the pressure decrease that the delivery valve 3 creates.

Also, while the present invention has so far been described as applied to a water injection system as a means for suppressing the production of nitrogen oxides in the combustion chamber of an internal-combustion engine, the system according to the invention lends itself equally well for the injection of any other liquid than water together with fuel oil.

Moreover, it is desirable to control the valve according to the driving condition of the engine.

Namely, continuous reckless water injection to answer every driving condition of the engine will result in making the amount of water consumed markedly large. As the amount of water consumed becomes large, a tank of corresponding volume will be required and, as a result, various disadvantages occur in spacing, weight and cost. Therefore, it is desired to carry out water injection only when its effect is to be expected. For instance, 1. Since $NO_x$ in large amounts is apt to be discharged at the instant of high-load driving and high-speed rotation, it is desirable to effect water injection at that time in view of its efficiency.

2. If water is mixed with fuel while the combustion chamber is in the warm-up condition (namely, at the time of the starting of the engine), gasification of the fuel is disturbed and sufficient ignition may result to worsen the starting-up of the engine. Such being the case, water injection should not be carried out at the instant of engine start. Even though the engine is not being started-up, when the temperature of the ambient air is so low that the combustion chamber has not been sufficiently warmed up, water injection should not be effected for the same reason as mentioned above.

3. When the engine is stopped under conditions of water remaining around the nozzle, rust is liable to occur about the nozzle. Therefore, water injection should be interrupted when the rotating speed of the engine comes short of a predetermined value at the instant of engine stop.

In order to achieve the objects of Items 1 to 3, the valve 7 has only to be opened or closed according to a detected value after detecting load condition on the engine, its rotating speed, temperature and starting time. Out of the above mentioned four elements of detection, the load condition of the engine and its starting time are of fundamental importance but its rotating speed and temperature may be detected in case of need.

When a pneumatic governor is used, load condition on the engine can be detected based on the position of the rack of the fuel injection pump but when a mechanical governor is used, it can be detected based on the extent of negative pressure in the air-suction pipe. In this case, detecting means in customary use may be adopted.

The rotating speed of the engine can be detected by a tachometer, as well as in terms of changes in generated volt of the electric generator. In this case, detecting means in customary use may be adopted.

Whether or not the engine is already warmed up can be detected by the temperature of cooling water of the engine in most cases. Besides, it may be detected by the temperature of the engine body or by the temperature of the exhaust gas. For such detection, usual means in customary use may be employed.

Also, as to the starting time of the engine, the time of rotation of the starter motor can be regarded as the time of starting which can be detected by means of a relay.

FIG. 4 shows a preferred embodiment of the control mechanism for the valve 7.

In FIG. 4, numeral 71 indicates a temperature-detecting switch embedded in the water jacket of the engine. This switch, for example, is so designed as to set "On" at water temperature more than 60°C. Numeral 72 is a rotation-speed-detecting switch for obtaining the rotating speed of the engine. It is so designed as to set On, for example, at more than 1000 rpm. Numeral 73 is a load-detecting switch secured to the rack of a fuel injection pump, and it is so designed as to set On at more than three-fourths load.

Numeral 74 is a detecting relay at the instant of engine start. This relay is of the usual construction consisting of a coil 75, an iron core 76 and a contact point 77. When the starter motor 78 is actuated to start the engine, the coil 75 is adapted to attract the iron core 76 so as to set the contact point Off. That is to say, while the starter switch is set On, the detecting relay 74 at the instant of start is set Off.

Numeral 79 is a start key switch and numeral 80 is a battery. To the battery 80 are connected the wirings 81 and 82 in parallel while the switches 71, 72, 73, the relay 74 and the battery 80 in series are connected to the valve 7.

The valve 7 is an electro-magnetic one. While electric current is flowing, the pipe passage 8 is caused to open due to electromagnetic force.

Out of the above-mentioned four switches and relays 71–74, the switch 72 can be dispensed with, if, there is almost no fear that the engine will stall. On the other hand, if the engine is destined to be driven after it has been sufficiently warmed up, the switch 71 can be omitted.

At the instant of engine start, the relay 74 is set Off, so that the valve 7 is closed.

At the driving instant of the engine, the valve 7 is opened insofar as one of the switches 71, 72 and 73 is set Off.

When the temperature of cooling water comes down to less than 60°C, the switch 71 is set Off and the control valve 7 is closed. Namely water cannot be injected while the engine is kept in cool condition.

Since, the switch 72 comes to Off at less than 1000 rpm of the engine, water does not pass to the nozzle 5 when the engine is stopped.

At the same time, since the switch 73 is set Off at less than three-fourths load, water cannot be supplied to the nozzle 5 before the engine stalls. This tendency occurs in the same manner in the case of light load on the engine.

What is claimed is:

1. In an internal combustion engine provided with a fuel injection system comprising a fuel injection pump arranged to receive a supply of fuel, a delivery valve connected to said fuel injection pump for receiving fuel from said fuel injection pump, a fuel pipe having a first end connected to said delivery valve and a second end, and a fuel injection nozzle connected to the second end of said fuel pipe and arranged to inject fuel into a combustion chamber, and an apparatus for supplying water to said fuel injection nozzle, wherein the improvement comprises that said apparatus for supplying water comprises a water tank, a water pipe interconnecting said water tank and said fuel injection nozzle, and a check valve located in said water pipe, said fuel injection nozzle comprising an orifice through which the fuel is injected into the combustion chamber, said fuel injection nozzle forming a space therein in communication with said orifice so that the fuel flows from the space into said orifice, said fuel injection nozzle forming a fuel passage and a separate water passage with said fuel passage extending between said fuel pipe and said space in said fuel injection nozzle and said water passage extending between said check valve in said water pipe and said space in said fuel injection nozzle, said delivery valve comprises a piston located therein in the path of flow of the fuel from said fuel injection pump to said fuel pipe, said piston being displaceable within said valve from a first position blocking flow therethrough to a second position permitting flow therethrough, said piston having a volume approximately equal to the volume of water to be injected so that as it is displaced from the second position to the first postion a negative pressure is developed in said fuel pipe, said fuel passage and said space and acts in said water passage to open said check valve for admitting an amount of water from said water tank approximately equal to the volume of said piston.

2. In an internal combustion engine, as set forth in claim 1, wherein said apparatus for supplying water comprises a valve positioned within said water pipe between said check valve and said water tank for controlling the flow of water from said water tank to said check valve, and means connected to said valve for detecting the driving condition of the engine so that said valve can be operated depending on the driving conditions of the engine.

3. In an internal combustion engine, as set forth in claim 2, wherein said valve is an electromagnetic valve, and said means for detecting the driving conditions includes a circuit for controlling said electromagnetic valve and a load detecting switch and an engine start-up detecting relay each located in said control circuit.

4. In an internal combustion engine, as set forth in claim 2, wherein said valve is an electromagnetic valve, and said means for detecting the driving conditions of the engine includes a circuit for controlling said electromagnetic valve and said control circuit includes an engine load-detecting switch, a switch for detecting the temperature of the engine, and a relay for detecting the start-up of the engine.

5. In an internal combustion engine, as set forth in claim 2, wherein said valve is an electromagnetic valve, and said means for detecting the driving conditions of the engine includes a circuit for controlling said electromagnetic valve, said control circuit including a switch for detecting the load on the engine, a switch for detecting the rotating speed of the engine, a switch for detecting the temperature of the engine, and a relay for detecting the start-up of the engine.

* * * * *